(12) United States Patent
Sakurai et al.

(10) Patent No.: US 7,374,493 B2
(45) Date of Patent: May 20, 2008

(54) POWER TRANSMISSION SHAFT

(75) Inventors: Katsuhiro Sakurai, Shizuoka-ken (JP); Tohru Nakagawa, Shizuoka-ken (JP)

(73) Assignee: NTN Corporation, Osaka (JP)

( * ) Notice: Subject to any disclaimer, the term of this patent is extended or adjusted under 35 U.S.C. 154(b) by 203 days.

(21) Appl. No.: 10/987,300

(22) Filed: Nov. 15, 2004

(65) Prior Publication Data
US 2005/0107169 A1 May 19, 2005

(30) Foreign Application Priority Data
Nov. 19, 2003 (JP) ............................. 2003-389793

(51) Int. Cl.
*F16C 3/02* (2006.01)

(52) U.S. Cl. .................... 464/179; 403/359.6; 464/906

(58) Field of Classification Search ............ 403/359.1, 403/359.2, 359.6; 464/182, 906, 179
See application file for complete search history.

(56) References Cited

U.S. PATENT DOCUMENTS

| | | | |
|---|---|---|---|
| 2,015,430 A | * | 9/1935 | Matthews et al. |
| RE20,270 E | * | 2/1937 | Matthews et al. |
| 5,213,437 A | * | 5/1993 | Sommer ............ 403/359.6 |
| 5,527,126 A | | 6/1996 | Digel et al. |
| 5,660,494 A | * | 8/1997 | Schwarzler et al. ..... 403/359.6 |
| 5,779,551 A | * | 7/1998 | Stall et al. |
| 6,685,572 B2 | * | 2/2004 | Makino et al. ........... 464/182 |
| 2002/0173363 A1 | * | 11/2002 | Makino et al. ........... 464/182 |
| 2003/0017878 A1 | * | 1/2003 | Muju et al. |
| 2003/0057052 A1 | * | 3/2003 | McClay |

FOREIGN PATENT DOCUMENTS

| | | |
|---|---|---|
| EP | 1 403 537 A1 | 3/2004 |
| JP | 2003-112502 | 4/2003 |

OTHER PUBLICATIONS

Nanaware et al. Failures of rear axle shafts of 575 DI tractors, [Online], [retrieved on Jan. 22, 2007]. retrieved from the internet <URL: http://www.sciencedirect.com>.*

P.P. Benham et al., Mechanics of Solids and Structures, Chapter 17 "Stress Concentration", Pitman Books Limited, Pitman Publishing Inc., Marshfield, Massachusetts, 1973, pp. 392-407.

* cited by examiner

*Primary Examiner*—Greg Binda
(74) *Attorney, Agent, or Firm*—Arent Fox LLP (57) ABSTRACT

A power transmission shaft such as a spline shaft and a serration shaft is provided which has improved static strength and fatigue strength. In a power transmission shaft, a diameter expansion surface is formed in a valley section of a tooth on the opposite side of a shaft end. First blunt sections in the shape of a curved surface are formed in corners between the diameter expansion surface and a tooth surface adjacent to the diameter expansion surface, in order to blunt edges.

10 Claims, 7 Drawing Sheets

POWER TRANSMISSION SHAFT

BACKGROUND OF THE INVENTION

1. Field of the Invention

The present invention relates to a power transmission shaft for transmitting running torque.

2. Description of the Related Art

In a drive shaft of an automobile or the like, a power transmission shaft is coupled to a constant velocity universal joint. In many cases, the power transmission shaft is coupled to an inner ring of the constant velocity universal joint with splines or serrations (hereinafter collectively represented by the "splines") formed at a shaft end. To mold the splines of this type of power transmission shaft, plastic working such as form rolling and press working is used in consideration of workability and cost.

Figure 6:
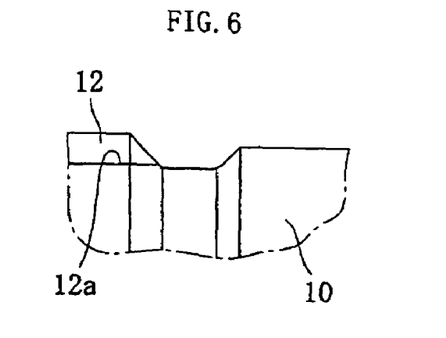
FIG. 6 is an enlarged sectional view showing an essential part of a power transmission shaft 10 with a direct incision type of teeth.
Figure 7:
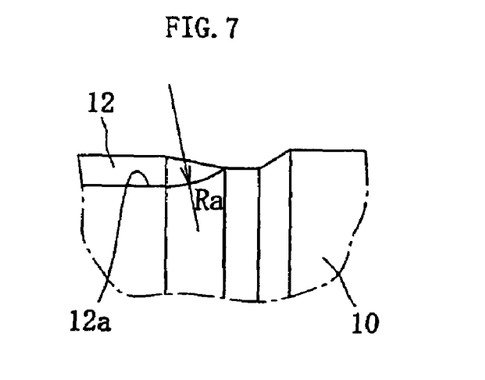
FIG. 7 is an enlarged sectional view showing an essential part of a power transmission shaft 10 with a round up type of teeth.

There are various types of shape of an end portion of the spline, which is formed on the power transmission shaft, on the opposite side of the shaft end. There are a type, for example, in which a valley section 12a of a tooth 12 on the side of a power transmission shaft 10 directly leads to an outer surface of the power transmission shaft 10 as shown in FIG. 6 (hereinafter called "direct incision type"), a type in which the valley section 12a of the tooth 12 leads to the outer surface of the power transmission shaft 10 with smoothly enlarging the diameter of the valley section 12a as shown in FIG. 7 (hereinafter called "round up type") and the like. In the "round up type," a surface of the valley section 12a, the diameter of which is smoothly enlarged, (hereinafter called "diameter expansion surface") is generally formed in the shape of an arc with a radius of Ra in cross section (there is a case that the surface is formed in the shape of a spherical surface). In this case, it is known that increase in the radius of curvature Ra of the diameter expansion surface can increase the effect of relieving stress, and hence improve the strength of the power transmission shaft.

Japanese Patent Laid-Open Publication No. 2000-97244 discloses an example of the power transmission shaft having the foregoing round up type of splines. In this power transmission shaft, a diameter expansion area is formed at an end of the spline, and a section engaging with an corresponding outer member is formed inside the diameter expansion area. Accordingly, it is possible to improve the strength of the power transmission shaft in terms of both static strength and fatigue strength.

By the way, in recent years, the enhancement of emission control, the improvement of fuel efficiency and the like are strongly desired in the automobile due to an upsurge of interest in environmental issues. As part of measures against them, further weight reduction and improvement in strength are strongly desired in the power transmission shaft such as a drive shaft and a propeller shaft.

SUMMARY OF THE INVENTION

An object of the present invention is to further improve the strength of a power transmission shaft such as a spline shaft and a serration shaft.

To achieve the foregoing object, a power transmission shaft according to the present invention has axial teeth in an outer periphery thereof in order to transmit torque between the teeth and an associated member through tooth surfaces. An end of a valley section of the tooth leads to the outer periphery of the power transmission shaft through a diameter expansion surface, the diameter of which is enlarged in an axial direction. In the power transmission shaft, a blunt section is provided in a corner between the diameter expansion surface and the tooth surface adjacent to the diameter expansion surface, in order to blunt an edge between them.

Figure 8:
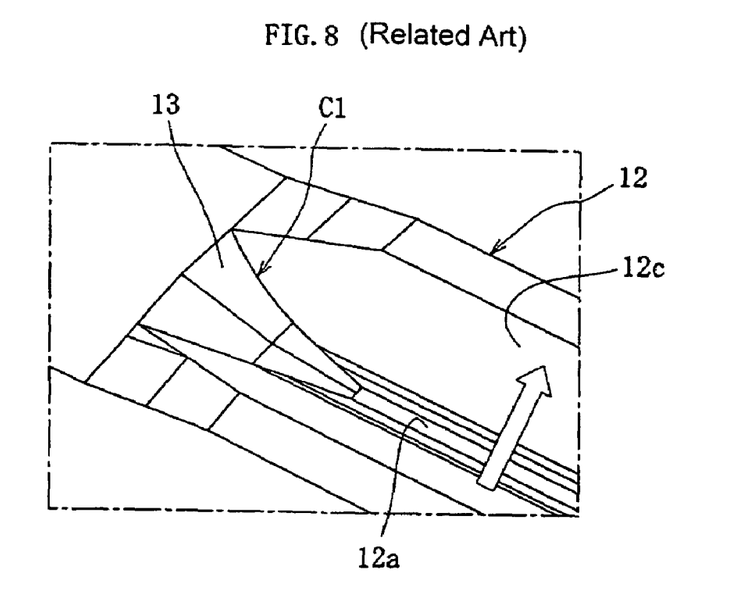
FIG. 8 is an enlarged perspective view showing an essential part at a spline end side of a conventional power transmission shaft 10.

FIG. 8 is an enlarged perspective view showing a tooth (for example, a spline) of a conventional power transmission shaft on the opposite side of a shaft end. In transmitting torque, tooth 12 of the power transmission shaft receives a load from a tooth of a not-illustrated associated member (boss), which is engaged with the outer periphery of the power transmission shaft, in a direction normal to the axial direction (a direction of an arrow in FIG. 8). At this time, large bending stress occurs in the base of the tooth 12 of the power transmission shaft in accordance with bending moment.

By the way, this type of axial teeth is generally molded by form rolling. In manufacturing process of a rolling rack, however, a mold section of an area nearer to the shaft end than a diameter expansion surface 13 (an effective area) is first formed, and then a mold section of the diameter expansion surface 13 is formed by chamfering an end face of the mold section of the effective area, in general. Thus, in the rack, a boundary section between a side surface of the tooth and the mold section of the diameter expansion surface becomes an edge. Accordingly, the edge of the rack is transferred to a material in form rolling, and hence a corner C1 between a valley section 12a and a tooth surface 12c of the tooth 12 becomes an edge. The present invention focuses on the edge in the corner C1 between the diameter expansion surface 13 and the tooth surface 12c, which has not been considered conventionally. By providing a first blunt section 25 for blunting the edge in the corner C1, as shown in FIG. 3, stress concentration occurring in the corner C1 is relieved, for the purpose of improving the static strength and the fatigue strength of the power transmission shaft.

Figure 3:
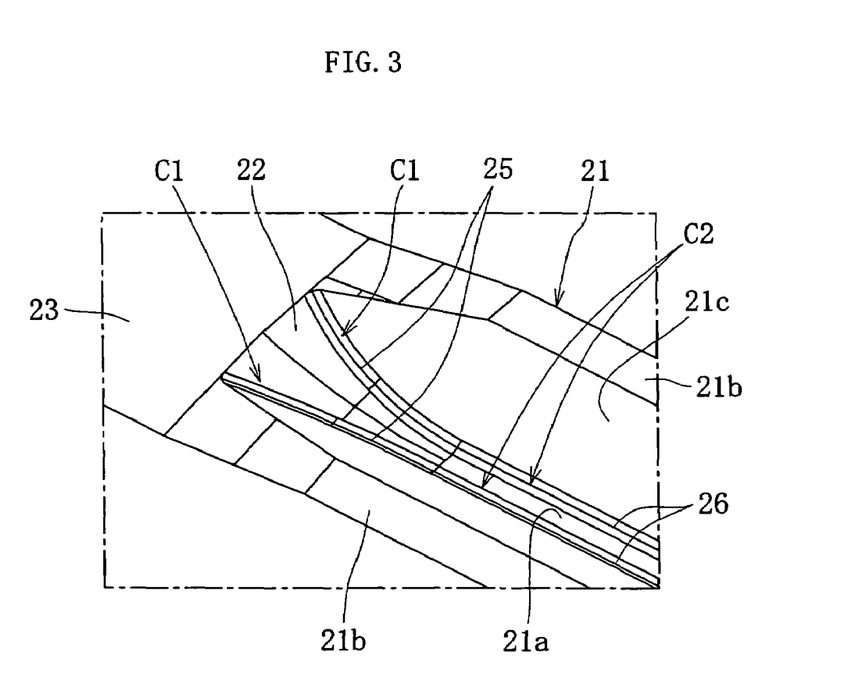
FIG. 3 is an enlarged perspective view showing an essential part of a power transmission shaft 2, in which curved surfaces are formed in corners C1.

As concrete means for blunting the edge, the first blunt section 25 may be formed into a curved surface (refer to FIG. 3).

With regard to the spline shaft having the corner C1 of which is blunted with the curved surface like this, stress in the corner C1 was analyzed with varying a radius of curvature of the curved surface (Rc=R0.15, Rc=R0.25). It turned out that, as shown in Table 1, increase in the radius of curvature Rc of the curved surface increases the effect of relieving the stress, and hence, is effective at strengthening the power transmission shaft.

TABLE 1

| Radius of curvature Rc(mm) | R0.15 | R0.25 |
|---|---|---|
| Stress in corner C1 | 1 | 0.88 |

A stress value at Rc = 0.25 is a relative value, as a stress value at Rc = 0.15 is set to 1.

Therefore, according to the present invention, blunting the corner makes it possible to relieve the stress concentration, and therefore, to increase the load capacity of the power transmission shaft.

Figure 4:
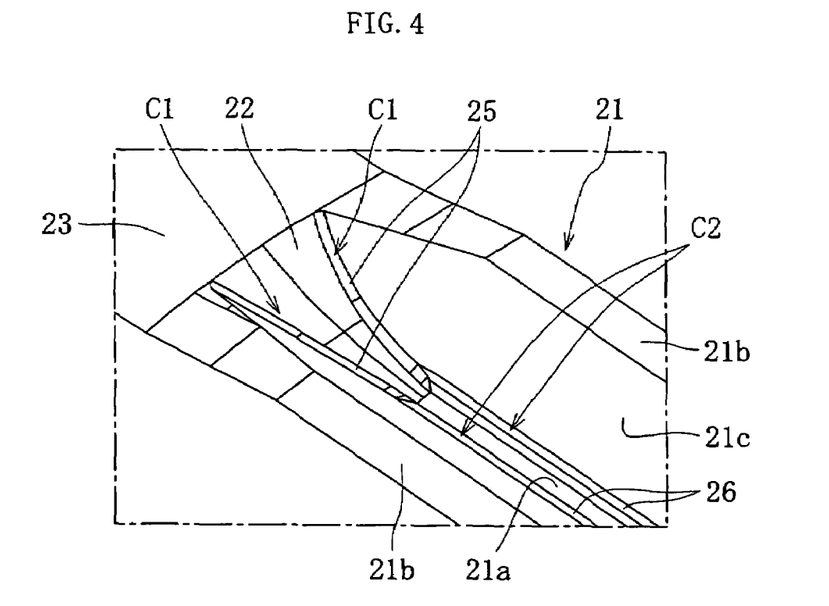
FIG. 4 is an enlarged perspective view showing an essential part of a power transmission shaft 2, in which corners C1 are subjected to chamfering.

The foregoing effect can be obtained when the first blunt section 25 is formed into chamfered surface (refer to FIG. 4).

Figure 5:
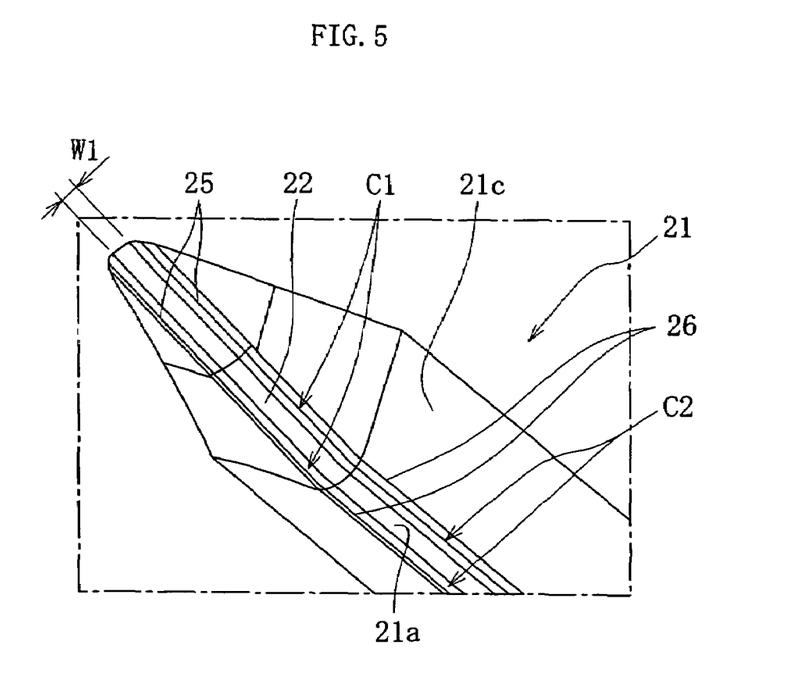
FIG. 5 is an enlarged perspective view showing an essential part of a power transmission shaft 2 having a boat-shape type of diameter expansion area S1.

The foregoing structure is applicable irrespective of the shape of the diameter expansion surface. For example, the foregoing structure is applicable to a diameter expansion surface 22 the circumferential width of which is constant in the axial direction as shown in FIG. 5 (hereinafter called "boat-shape type"), in addition to a diameter expansion surface 22 the circumferential width of which is enlarged on the opposite side of the end of the valley section in the axial direction, as shown in FIGS. 3 and 4.

It is conceivable that the first blunt sections are formed after plastic processing of the teeth. Blunting concave edges after the formation of the edges is technically difficult, and causes increase in manufacturing cost. Therefore, it is preferable to mold the first blunt sections simultaneously with the teeth by plastic working. Form rolling or press working is available as the plastic working. In this case, it is possible to mold the first blunt sections simultaneously with the teeth, by previously blunting a corresponding part to the first blunt sections of a rolling rack or die for press.

From the same viewpoint, as shown in FIG. 3, a second blunt section 26 may be provided in a corner C2 between the valley section 21a of the tooth and the tooth surface 21c adjacent to the valley section 21a in the effective area of the tooth, in order to blunt an edge between them. Therefore, the stress concentration is relieved over the whole length in the axial direction of the teeth 21, so that the second blunt sections 26 can improve the strength of the teeth together with the first blunt sections 25. In this case, it is preferable that the first blunt sections 25 and the second blunt sections 26 are continuously formed.

Figure 2:
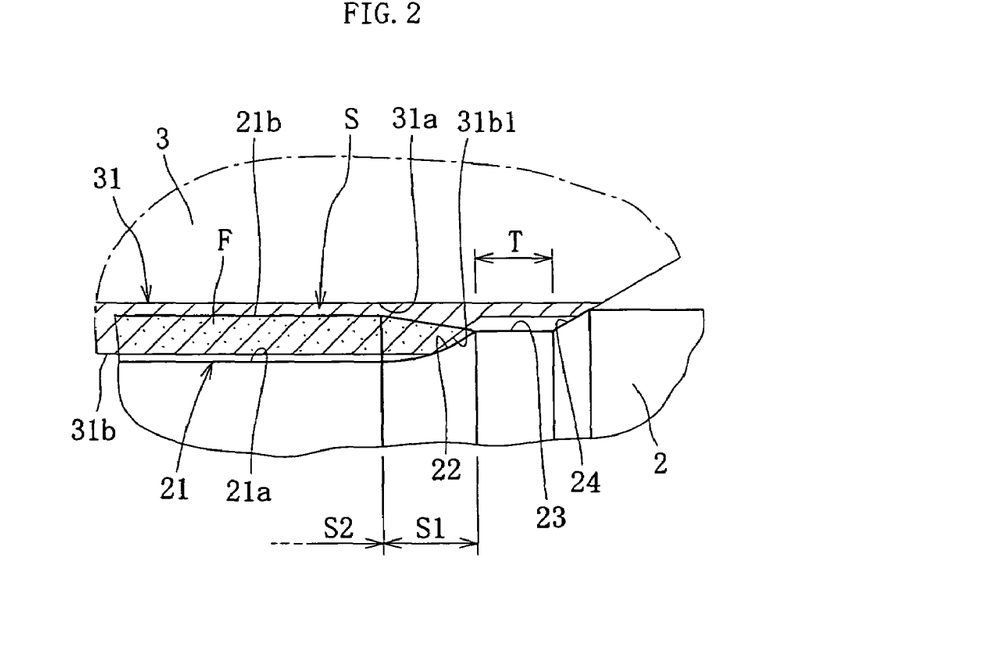
FIG. 2 is an enlarged sectional view showing an essential part of a power transmission shaft 2 which is coupled to an inner ring of the constant velocity universal joint 1.

Referring to FIG. 2, an engagement section F (shown in a dot pattern), which engages with an associated member, is provided in the diameter expansion area S1 of the tooth 21. Therefore, it is possible to further improve the strength of the power transmission shaft 2 in terms of both the fatigue strength and the static strength.

Coupling the foregoing power transmission shaft to an inner joint member or an outer joint member of the constant velocity universal joint makes it possible to provide the constant velocity universal joint with high strength.

According to the power transmission shaft of the present invention, as described above, it is possible to improve the static strength and the fatigue strength of the power transmission shaft such as the spline shaft and the serration shaft.

DETAILED DESCRIPTION OF THE PREFERRED EMBODIMENTS

Embodiments of the present invention will be hereinafter described on the basis of the accompanying drawings.

Figure 1:
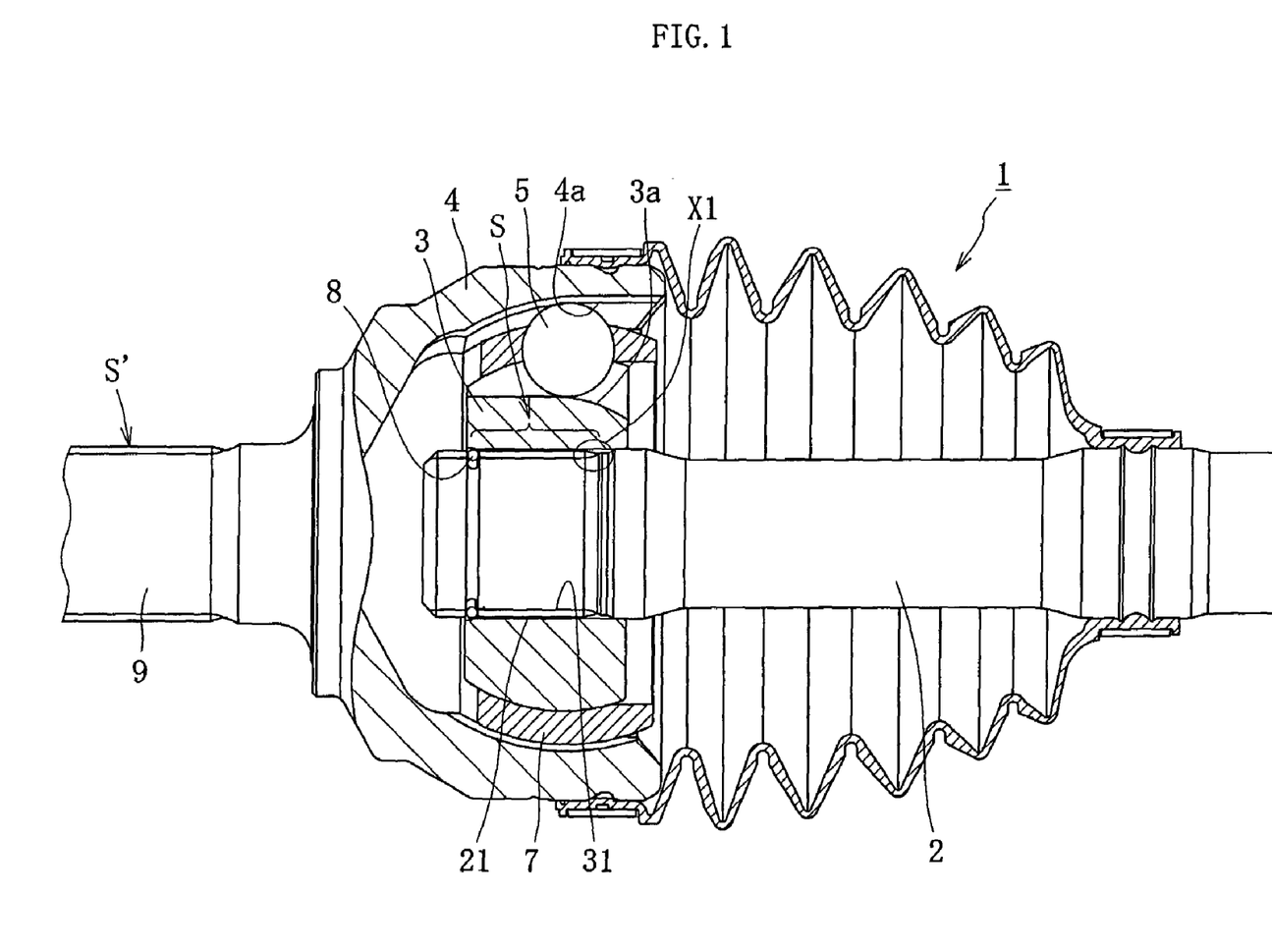
FIG. 1 is a sectional view of a constant velocity universal joint 1 in an axial direction.

FIG. 1 shows a constant velocity universal joint 1, in which a power transmission shaft 2 according to the present invention is coupled to an inner ring 3. This constant velocity universal joint 1 mainly comprises the inner ring 3, an outer ring 4, and balls 5 as main components. The inner ring 3 is fixed to the power transmission shaft 2 on one side and serves as an inner joint member. The outer ring 4 is disposed diametrically outside of the inner ring 3, is fixed to a power transmission shaft 9 on the other side, and serves as an outer joint member. The balls 5 transmit torque between the inner ring 3 and the outer ring 4 and serves as a torque transmission member. In the constant velocity universal joint in the drawing called a Rzeppa type, the balls 5 are disposed on a ball track, which is composed of a track groove 3a formed in the outer periphery of the inner ring 3 and a track groove 4a formed in the inner periphery of the outer ring 4, and a cage 7 holds the plurality of balls 5 disposed in a circumferential direction at regular intervals. The structure of the constant velocity universal joint 1 is not limited to that of the drawing. Various types of constant velocity universal joints including a tripode-type constant velocity universal joint are available.

A torque transmission section S is formed in the outer periphery of a shaft end of the power transmission shaft 2. In the torque transmission section S, a plurality of teeth 21 such as splines and serrations extending in an axial direction are disposed in a plurality of locations in the circumferential direction. The teeth 21 of the torque transmission section S are engaged with a plurality of teeth 31 formed in the inner periphery of the inner ring 3 serving as an associated member, as shown in FIG. 2, so that the power transmission shaft 2 and the inner ring 3 are coupled in a torque transmittable manner. An internal end of the inner ring 3 on the opposite side of the shaft end makes contact with, for example, a shoulder section 24 in the outer periphery of the power transmission shaft 2. An internal end of the inner ring 3 on the side of the shaft end is secured with, for example, a snap ring 8 (refer to FIG. 1). Thus, the inner ring 3 is positioned and fixed in an appropriate position in the axial direction with respect to the power transmission shaft 2.

Referring to FIG. 3, the teeth 21 of the power transmission shaft 21 comprise valley sections 21a and ridge sections 21b extending in the axial direction. The valley section 21a and the ridge section 21b are alternately disposed in the circumferential direction. This tooth 21 is a round up type, and a diameter expansion surface 22, the diameter of which is smoothly enlarged in the shape of an arc, is formed at an end of each valley section 21a on the opposite side of the shaft end. A large diameter side of the diameter expansion surface 22 leads to the outer surface of the power transmission shaft 2, that is, the outer surface of a smooth section 23 formed adjacently to the torque transmission section S in an illustrated example. Of the tooth 21, an area surrounded by the diameter expansion surface 22 and a tooth surface 21c adjacent to the diameter expansion surface 22 is hereinafter called a diameter expansion area S1, and an area surrounded by a part of the valley section 21a exclusive of the diameter expansion surface 22 and the tooth surface 21c adjacent thereto is hereinafter called an effective area S2 of the tooth (refer to FIG. 2). The cross section of the diameter expansion surface 22 in the axial direction may be formed by a combination of an arc and a straight line, or only a straight line, instead of formed by only an arc.

Valley sections 31a between the teeth 31 are formed in the inner periphery of the inner ring 3, and to an end portion of the inner ring 3 on the opposite side of the shaft end with maintaining a constant diameter. Ridge sections 31b being the outer surface of the teeth 31, on the other hand, have an inclined rise section 31b1 on the opposite side of the shaft end, and a clearance area T, the internal diameter of which is larger than that of an entrance, on the further opposite side of the shaft end than the rise section 31b1. The internal diameter of the clearance area T is set to larger than the external diameter of the smooth section 23 of the power transmission shaft 2, and smaller than the external diameter of the shoulder section 24 formed at an end of the smooth section 23.

The teeth 21 of the power transmission shaft 2 and the teeth 31 of the inner ring 3 are engaged with each other. An engagement section F between them (illustrated by a dot pattern) is provided in not only the effective area S2 of the tooth 21 but also the diameter expansion area S1. Thus, the tooth surfaces of the teeth 21 and the tooth surfaces of the teeth 31 make contact with each other even in the diameter expansion area S1 in the circumferential direction, so that it is possible to improve fatigue strength and static strength.

Referring to FIG. 3, first blunt sections 25 in the shape of a curved surface are formed in the corners C1 between the diameter expansion surface 22 of the valley section 21a of the tooth 21 and both tooth surfaces 21c adjacent to the diameter expansion surface 22. The diameter expansion surface 22 is smoothly connected to the tooth surfaces 21c through the first blunt sections 25. A cross section of the first blunt section 25 may be formed by a compound curve, which is composed of a plurality of arcs with different curvatures, instead of an arc with a single curvature.

In the constant velocity universal joint 1 to which the foregoing power transmission shaft 2 is coupled, when torque is transmitted between the inner ring 3 and the power transmission shaft 2, the teeth 21 of the power transmission shaft 2 receive loads from the teeth 31 of the inner ring 3 in directions normal to the tooth surfaces 21c. Thus, bending stress occurs in the teeth 21 in accordance with bending moment. The first blunt sections 25, which are formed in the corners C1 between the diameter expansion surface 22 and the tooth surface 21c adjacent to the diameter expansion surface 22 as shown in FIG. 3, relieve the stress concentration in the corners C1. Therefore, the static strength and the fatigue strength of the torque transmission section S are increased, and hence it is possible to increase the strength of the power transmission shaft 2 itself.

The first blunt section 25 is formed by a curved surface in this embodiment. However, similar effect can be obtained even when the first blunt section 25 is formed by a chamfered plane.

Figure 9:
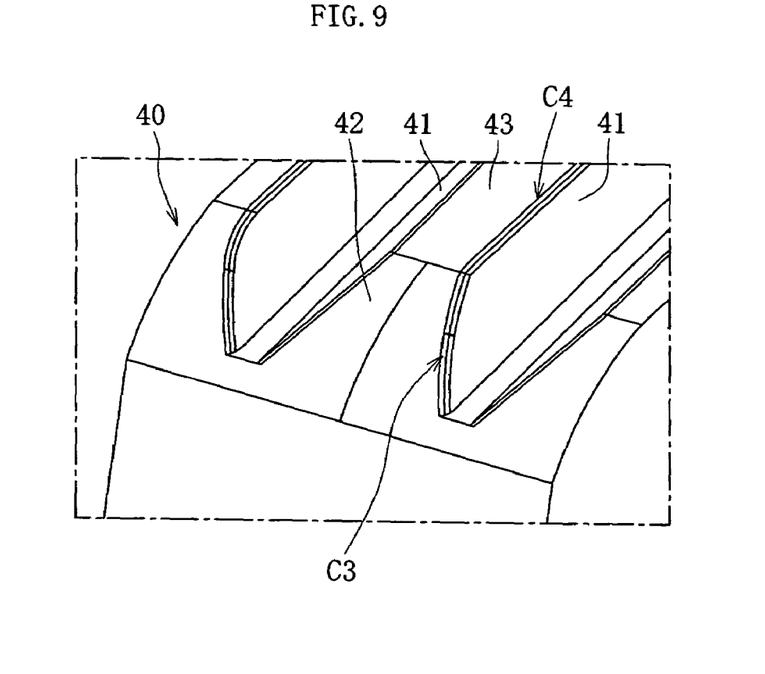
FIG. 9 is a perspective view of a rolling rack 40 for molding a lance-shape type of spline by form rolling.

The blunt sections 25 are formed simultaneously with the teeth 21 by form rolling. FIG. 9 is a perspective view of a rolling rack 40 used in the form rolling. As shown in the drawing, the rolling rack 40 has tooth surface mold sections 41 for molding the tooth surfaces 21c, a diameter expansion surface mold section 42 for molding the diameter expansion surface 22, and a valley section mold section 43 for molding the valley section 21a of the teeth 21. Since corners C3 between the tooth surface mold section 41 and the diameter expansion surface mold section 42 are blunted into a convex curved surface by wire processing, electric discharge machining or the like, the teeth 21 and the concave curved blunt sections 25 are simultaneously formed during plastic deformation by the form rolling. Chamfering the corners C3 of the rolling rack 40 into a plane shape makes it possible to form the plane-shaped blunt sections 25 in the corners C1. Since the plastic working of the blunt sections 25 is carried out simultaneously with the plastic working of the teeth 21, as described above, it is possible to increase production efficiency, and therefore reduce cost, as compared with a case where the blunt sections 25 are formed by another process after molding the teeth 21.

In the foregoing description, the first blunt sections 25 are formed in the diameter expansion areas S1 of the teeth 21. This type of blunt sections, however, may be formed in the effective area S2. Referring to FIGS. 3 and 4, blunt sections 26 (second blunt sections) are formed in corners C2 between the valley section 21a in the effective area S2 of the torque transmission section S and the tooth surface 21c adjacent to the valley section 21a into the shape of a curved surface or a chamfered plane. Since the blunt sections 26 are formed not only in the diameter expansion area S1 but also in the effective area S2, as described above, the stress concentration is relieved in the whole length of the teeth 21 along the axial direction. Therefore, it is possible to further increase the strength of the power transmission shaft 2. Referring to FIG. 9, as in the case of the first blunt sections 25, it is possible to mold the second blunt sections 26 simultaneously with the teeth 21 and further the first blunt sections 25 by blunting convex edges in corners C4 between the valley section mold section 43 of the rolling rack 40 and the tooth surface mold section 41 thereof.

Figure 10:
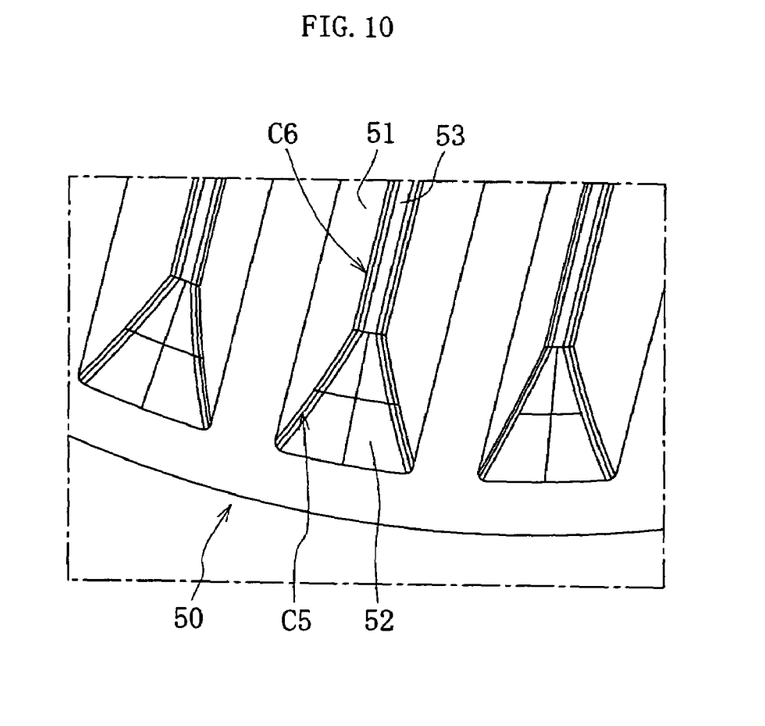
FIG. 10 is a perspective view of a die 50 for molding the lance-shape type of spline by press working.

The torque transmission section S can also be molded by plastic working except for the form rolling, such as press working. In such cases, as shown in FIG. 10, corners C5 between a tooth surface mold section 51 and a diameter expansion surface mold section 52 may be previously subjected to curved surface processing or chamfering, in a die 50 for the press working having the tooth surface mold sections 51, the diameter expansion surface mold sections 52, and valley section mold sections 53. Since corners C6 between the tooth surface mold section 51 and the valley section mold section 53 are subjected to the curved surface processing or the chamfering, the second blunt sections 26 can be formed in the corners C2 between the valley section 21a and the tooth surface 21c in the effective area S2 of the tooth 21. It is preferable that the curved surface processing and the chamfering be carried out by the wire processing or the electric discharge machining.

In the foregoing embodiment, the torque transmission section S is in a so-called "lance-shape type," in which the width of the diameter expansion surface 22 in the circumferential direction is enlarged on the opposite side of the shaft end, but the present invention is not limited to this. The present invention is applicable to a torque transmission section in another shape. To be more specific, there is a tooth 21 in a so-called "boat-shape type" as shown in FIG. 5, in which the width W1 of a diameter expansion surface 22 in the circumferential direction is kept constant. In such a case, it is possible to increase the strength of a power transmission shaft 2 in a like manner, by forming first blunt sections 25 in corners C1 between the diameter expansion surface 22 and a tooth surface 21c in a diameter expansion area S1, and second blunt sections 26 in corners C2 between a valley section 21a and the tooth surface 21c. The boat-shape type (FIG. 5) generally has a larger stress relieving effect than the lance-shape type (FIG. 4) in the corners C1 of the diameter expansion area S1, so that it is possible to promise further increase in the strength of the power transmission shaft 2. When the corners C1 and C2 are blunted into curved shapes in the boat-shape type, it is possible to make the shapes vary between the corners C1 and C2 by using different curvature. It is preferable, however, to blunt the blunt sections 25 and 26 into the same shape, from the viewpoint of increase in the strength.

Figure 11:
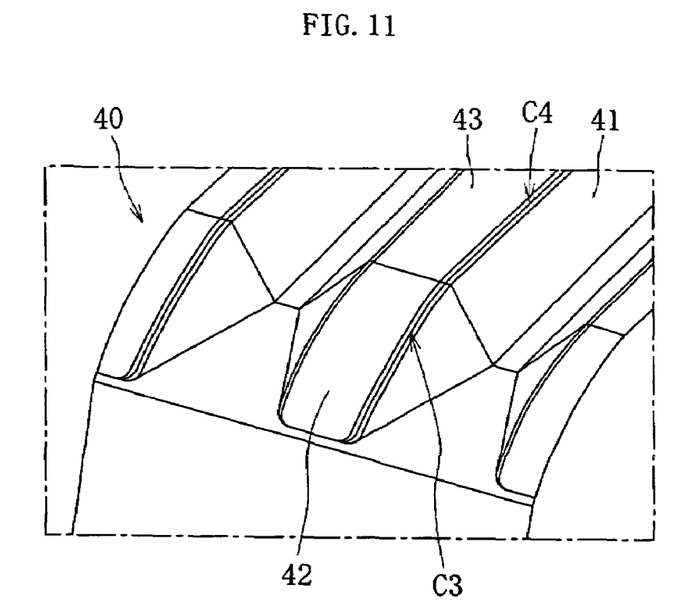
FIG. 11 is a perspective view of a rolling rack 40 for molding a boat-shape type of spline by form rolling.
Figure 12:
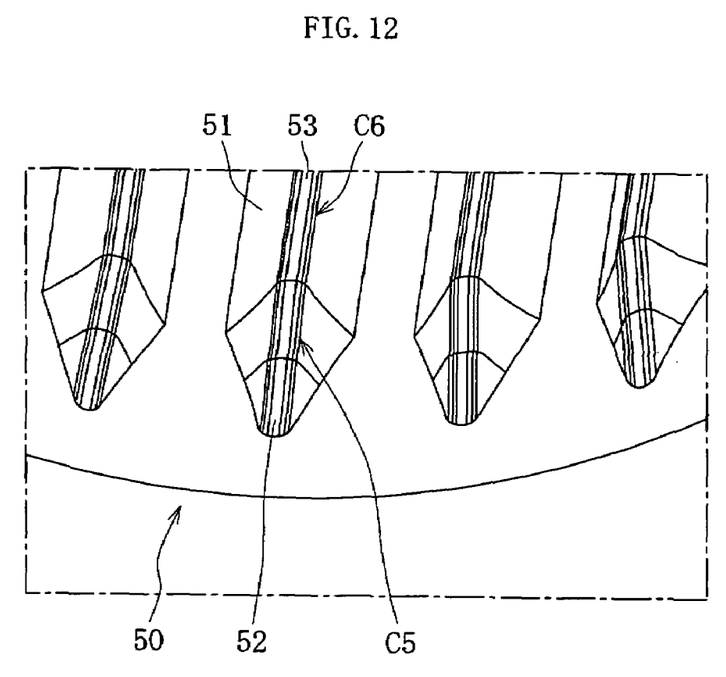
FIG. 12 is a perspective view of a die 50 for molding the boat-shape type of spline by press working.
Figure 13:
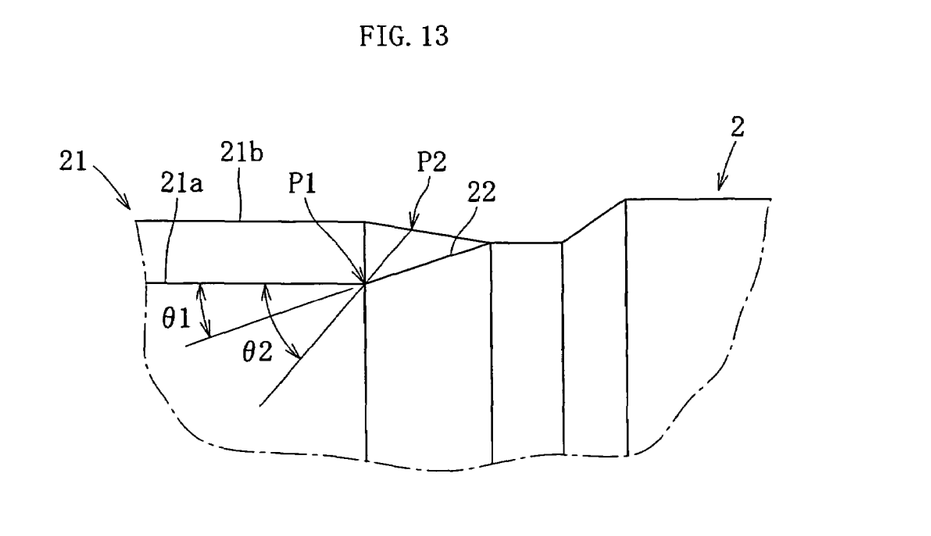
FIG. 13 is a sectional view of the power transmission shaft 2 in the axial direction, which shows the positional relation between a diameter expansion start point P1 and a tooth space width start narrowing point P2.

As in the case of the lance-shape type, the first and second blunt sections 25 and 26 of torque transmission section S in the boat-shape type can be made simultaneously with the teeth by the form rolling using the rolling rack 40 shown in FIG. 11, or the press working using the die 50 shown in FIG. 12. In both of the rolling rack 40 and the die 50, the first blunt sections 25 are made by blunting convex edges in the corners C3/C5 between the diameter expansion surface mold section 42/52 and the tooth surface mold section 41/51, and the second blunt sections 26 are made by blunting convex edges in the corners C4/C6 between the tooth surface mold section 41/51 and the valley section mold section 43/53. Means for blunting the edges in the corners C3 to C6 is typically the wire processing or the electric discharge machining. Especially in the rolling rack 40, it is possible to blunt the edges in the corners C3 to C6 by grinding with moving a grindstone in the direction of enlarging a diameter. In the press working, the diameter expansion surface 22 is formed into a straight tapered surface as shown in FIG. 13. Thus, it is preferable that a diameter expansion start point P1 of the diameter expansion surface 22 be formed by a curved surface or the like, and the valley section 21a and the diameter expansion surface 22 are smoothly connected to each other.

Figure 14A:
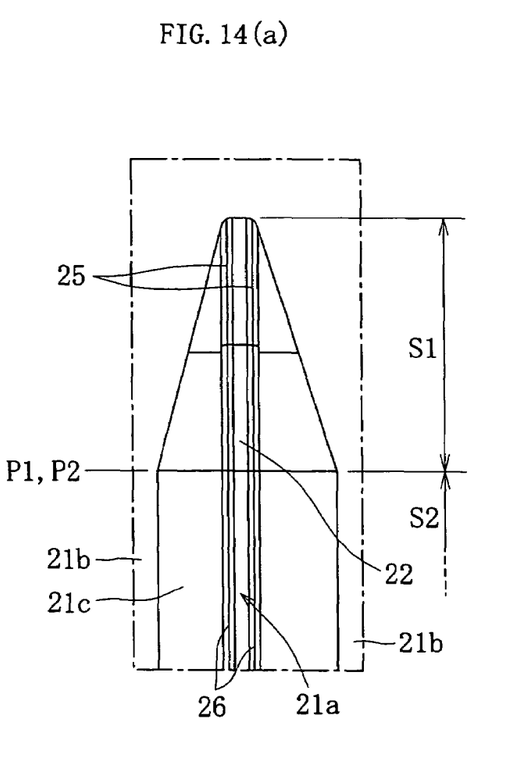
FIG. 14a is a substantial-part-enlarged plan view of a valley section in which the diameter expansion start point P1 overlaps with the tooth space width start narrowing point P2.

In the boat-shape type, as shown in FIG. 14a, the circumferential width of tooth space (space between the adjacent ridge sections 21b) in the diameter expansion area S1 is narrower than the circumferential width of tooth space in the effective area S2. In this case, the ridge sections 31b of the teeth 31 of the inner ring 3 on the opposite side of the shaft end are formed into a shape corresponding to the boat-shape type, so that the teeth 21 of the power transmission shaft 2 are engaged with the teeth 31 of the inner ring 3 in the diameter expansion area S1.

Figure 14B:
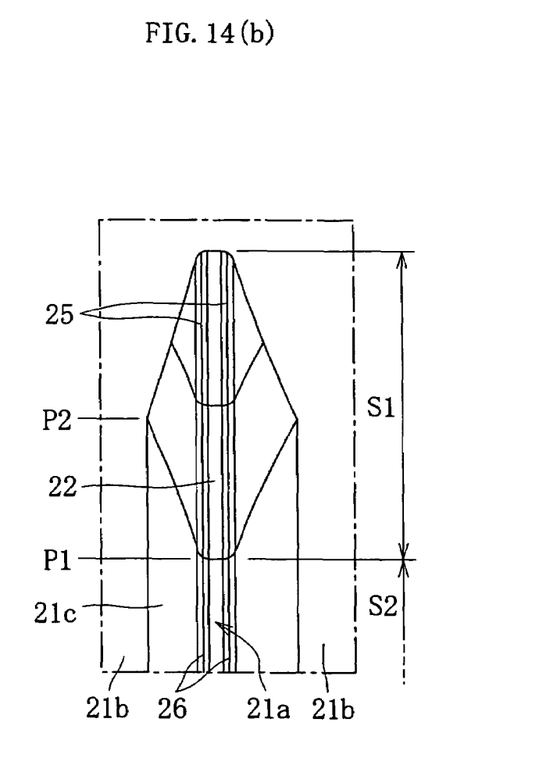
FIG. 14b is a substantial-part-enlarged plan view of a valley section in which the tooth space width start narrowing point P2 is in a diameter expansion area S1.

In the boat-shape type, as shown in FIG. 14a, the circumferential width of the tooth space starts narrowing from the point (diameter expansion start point) P1, from which the diameter expansion area S1 is started. However, a point (tooth space width start narrowing point) P2, where the circumferential width of the tooth space starts narrowing, may be moved inside the diameter expansion area S1 as shown in FIG. 14b, to engage the teeth 21 with the teeth 31 in the diameter expansion area S1. $\theta 1=\theta 2$ holds for the lance-shape type, and $\theta 2=90$ degrees holds for the general boat-shape type, where $\theta 1$ represents an angle of the diameter expansion surface 22 with respect to the center of the shaft, and $\theta 2$ represents an angle of a line connecting the diameter expansion start point P1 and the tooth space width start narrowing point P2 with respect to the center of the shaft ($\theta 1 \leqq \theta 2 < 90$ degrees).

In the foregoing embodiment, the teeth 21 is provided in the power transmission shaft 2, which is coupled to the inner ring 3 of the constant velocity universal joint 1 shown in FIG. 1. A torque transmission section S' with similar teeth may be formed in, for example, the power transmission shaft 9 (refer to FIG. 1) coupled to the outer ring 4.

What is claimed is:

1. A power transmission shaft having axial teeth in an outer periphery thereof in order to transmit torque between the teeth and an associated member through tooth surfaces, an end of a valley section of the tooth leading to an outer surface of the power transmission shaft through a diameter expansion surface, the diameter of which is enlarged in an axial direction, wherein a first blunt section is provided in a corner between the diameter expansion surface and the tooth surface adjacent to the diameter expansion surface in order to blunt an edge between them, a circumferential width of the diameter expansion surface is enlarged at the end of each valley section in the axial direction, and an engagement section, which engages with the associated member, is provided in a diameter expansion area of the tooth.

2. A power transmission shaft as claimed in claim 1, wherein the first blunt section is formed into a curved surface.

3. A power transmission shaft as claimed in claim 1, wherein the first blunt section is formed into a chamfered surface.

4. A power transmission shaft as claimed in claim 1, wherein a circumferential width of the diameter expansion surface is constant in the axial direction.

5. A power transmission shaft as claimed in claim 1, wherein the first blunt sections are plastic worked.

6. A power transmission shaft as claimed in claim 5, wherein the first blunt sections are form rolled.

7. A power transmission shaft as claimed in claim 5, wherein the first blunt sections are press worked.

8. A power transmission shaft as claimed in claim 1, wherein a second blunt section is provided in a corner between the valley section of the tooth and the tooth surface adjacent to the valley section in an effective area of the tooth in order to blunt an edge between them.

9. A constant velocity universal joint in which the power transmission shaft according to any one of claims 1-3 and 4-8 is coupled to an inner joint member or an outer joint member.

10. A power transmission shaft as claimed in claim 2, wherein the curved surface is a compound curved surface.

* * * * *